United States Patent Office 3,641,077
Patented Feb. 8, 1972

3,641,077
METHOD FOR PREPARING ALKOXY DERIVATIVES OF SILICON, GERMANIUM, TIN, THALLIUM AND ARSENIC
Eugene G. Rochow, Winchester, Mass.
No Drawing. Filed Sept. 1, 1970, Ser. No. 68,763
Int. Cl. C07f 7/00, 7/02, 7/22
U.S. Cl. 260—429 R          15 Claims

ABSTRACT OF THE DISCLOSURE

The invention provides a method for preparing organic metal compounds of the metals germanium, tin, thallium, arsenic and more particularly of silicon and comprises introducing an alcohol, such as methanol, ethanol, n-propanol, and iso-butanol, slowly below the surface of a suspension in silicone oil of a finely divided mixture of one of the above metals and catalyst, such as copper, containing about 9 parts by weight of the selected metal and about 1 part by weight of catalyst while heating the suspension at a temperature between about 250° C. and about 300° C. to cause the alcohol to react with the selected metal to form an organic metal compound in vapor form which is condensed and collected, the desired organic metal compound being isolated by fractional distillation of the condensate.

This invention relates to the direct synthesis of organic compounds of silicon, germanium, tin, thallium and arsenic, such as alkoxy compounds, which are useful as reagents for research.

Prior to the present invention various organometallic derivatives of the elements silicon, germanium, tin, thallium and arsenic have been produced by passing an organic compound reactant, such as chloromethane or other alkyl or aryl halide over a finely divided sintered mixture containing about 9 parts by weight of the selected element, such as silicon, and about 1 part by weight of a catalyst, such as copper, while heated at a temperature between about 250° C. and about 300° C. to cause the organic compound to react with the selected element to form an organometallic compound of the element which is present in the vapor evolved. The evolved vapor was condensed and collected. The desired organometallic compound was isolated by fractional distillation of the condensate. Other organic derivatives of the above elements were formed in the same manner by replacing the chloromethane by other organic compounds, such as chloro-n-propane, chloro-iso-propane, bromobenzene, chlorobenzene, allyl chloride, dichloroalkanes, r-chloropropylmethylidchlorosilane, etc. The organo metallic compounds produced by this method are organohalometal compounds that have their organic groups attached directly to the metal as illustrated by the formula

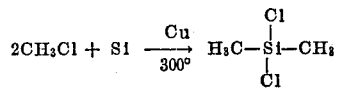

This prior method is unsuitable for making alkoxy and aroxy derivatives of the above mentioned elements by reaction with alcohol. Only methanol reacted to a limited extent. The compounds produced by this method are useful in the silicone industry.

The present invention provides a method by which alcohols, such as methanol, ethanol, n-propanol, iso-butanol and other alcohols may be reacted with silicon, germanium, tin, thallium or arsenic to form alkoxy or aroxy derivatives thereof of the type $(RO)_4Si$, $(RO)_3SiH$, $(RO)_2SiH_2$, etc. The reaction is illustrated by the formula

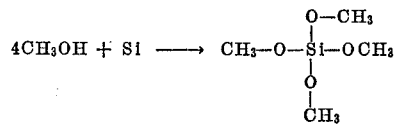

In accordance with the method of the present invention the organic compound reactant is slowly introduced below the surface of a suspension in silicone oil of a finely divided sintered, reduced or milled mixture containing about 1 part by weight of a catalyst, such as copper, and about 9 parts by weight of an element or metal selected from silicon, germanium, tin, thallium or arsenic while heating the suspension at a temperature between about 250° C. and about 300° C. to cause the organic compound reactant, such as methanol, ethanol, n-propanol, iso-butanol or other alcohol, to react with the selected metal or element to form the desired organometal compound and which is present in the vapor evolved from the suspension. The evolved vapor is condensed and collected, the desired organic derivative being isolated by fractional distillation of the condensate. The compounds produced by this method have their organic groups attached to oxygen atoms whereas compounds made by the above mentioned prior method have their organic groups attached directly to the metal, such as silicon, germanium, etc.

The finely divided mixture of silicon and copper used in the practice of the invention may be prepared in the following manner. Elementary silicon (90 grams), in the form of small grains (ca. 60 mesh), and copper powder (10 grams) is mixed together in a silicon glass tube, hydrogen is passed in, and the tube heated to ca. 1050° C. for two hours. It is then allowed to cool under hydrogen. The sintered material is then ground up and transferred to a reaction vessel for immediate use. The finely divided, sintered mixture of copper and germanium, tin, thallium or arsenic is prepared in a similar manner.

The invention is illustrated further by the following specific examples.

EXAMPLE 1

A dry 3-liter reaction vessel, containing Dow Corning DC710 silicone oil (450 ml.) and a 9:1 silicon-copper contact mixture (100 grams), was equipped with an electric stirrer, a thermometer probe, an inlet tube that extended below the surface of the reaction suspension and an exit, leading to a water condenser and receiver and a —78° cold trap, protected by a calcium chloride guard tube. The pre-dried apparatus was assembled, and the experiment carried out in a stream of nitrogen dried by passage over phosphorus pentoxide.

Methanol (100 ml. 80 grams) was then added dropwise, over a 4–5 hour period, to the rapidly-stirred reaction suspension heated to ca. 280° C., and the products were collected and distilled. A 1:4 azeotrope of trimethoxysilane and methanol (50 grams; B.P. 62.3°); identified by infrared and n.m.r. spectra, trimethoxysilane (18.2 grams; B.P. 81.3°, lit. B.P. 84°. Found: C, 29.9; H, 8.4. Calcd. for $C_3H_{10}O_3Si$: C, 29.5; H, 8.3%) (confirmed by infrared spectrum), tetramethoxysilane (14.4 grams; B.P. 120–2°, lit. B.P. 121°. Found: C, 31.8; H, 8.3. Calcd. for $C_4H_{12}O_4Si$: C, 31.6; H, 8.0%) (confirmed by infrared spectrum) and a residue (4.6 grams; infrared spectroscopy indicated a mixture of DC710 silicone oil and some polysiloxane) were obtained.

EXAMPLE 2

In an experiment similar to that of Example 1, ethanol (300 ml., 237 grams) was added to a silicon-copper contact mixture in suspension at 260°–270° C. On distillation, ethanol (188.4 grams; B.P. 78–80° C.; identified by infrared spectrum), triethoxysilane (27.8 grams; B.P. 132–4°, lit. B.P. 131°. Found: C, 44.5; H, 9.7. Calcd. for $C_6H_{16}O_3Si$; C, 43.9; H, 9.8%), tetraethoxysilane (7.0 grams; B.P. 163.6°, lit. B.P. 166–8°. Found: C, 45.8; H, 9.6. Calcd. for $C_8H_{20}O_4Si$: C, 46.1; H, 9.7%) (confirmed by infrared spectrum) and a residue (1.3 grams; infrared spectroscopy indicated DC710 silicone oil only) were obtained.

EXAMPLE 3

In an experiment similar to that of Example 1 at 290–10° C., n-propanol (300 ml., 240 grams) was used. The condensate from the reaction contained unreacted alcohol (217 grams; B.P. 44.8°; identified by infrared spectrum), tri-n-propoxysilane (9.7 grams; B.P. 186–8°, lit. B.P. 180–4°; identified by infrared and n.m.r. spectroscopy. Mol. Wt.—Found: 206 (by mass spectrometry). Calcd.: 206) and a residue (2.9 grams; infrared spectroscopy indicated DC 710 silicone oil only).

EXAMPLE 4

Iso-butanol (100 ml., 82 grams) was used in an experiment similar to that of Example 1, at 300° C. On distillation, unreacted alcohol (70.6 grams; B.P. 107–8°; identified by infrared spectrum), tri-iso-butoxy-silane (5.6 grams; B.P. 218–222°, lit. B.P. 224–8°; identified by infrared and n.m.r. spectroscopy. Mol. Wt.—Found: 248 (by mass spectrometry). Calcd.: 248) and a residue (0.6 gram; infrared spectroscopy indicated DC710 silicone oil only) were obtained.

I claim:

1. The method for preparing alkoxy derivatives of an element selected from the group consisting of silicon, germanium, tin, thallium and arsenic which comprises slowly introducing an alcohol below the surface of a suspension in silicone oil of a finely divided mixture containing about 9 parts by weight of the selected element and about 1 part by weight of copper while heating the suspension at a temperature between about 250° C. and about 300° C., said alcohol being selected from the group consisting of methanol, ethanol, n-propanol and iso-butanol.

2. The method as claimed by claim 1 wherein said alcohol is methanol.

3. The method as claimed by claim 1 wherein said alcohol is ethanol.

4. The method as claimed by claim 1 wherein said alcohol is iso-propanol.

5. The method as claimed by claim 1 wherein said alcohol is iso-butanol.

6. The method as claimed by claim 1 wherein said element is silicon.

7. The method as claimed by claim 1 wherein said element is germanium.

8. The method as claimed by claim 2 wherein said element is silicon.

9. The method as claimed by claim 2 wherein said element is germanium.

10. The method as claimed by claim 3 wherein said element is silicon.

11. The method as claimed by claim 3 wherein said element is germanium.

12. The method as claimed by claim 4 wherein said element is silicon.

13. The method as claimed by claim 4 wherein said element is germanium.

14. The method as claimed by claim 5 wherein said element is silicon.

15. The method as claimed by claim 5 wherein said element is germanium.

References Cited

UNITED STATES PATENTS

| | | | |
|---|---|---|---|
| 2,473,260 | 6/1949 | Rochow | 260—448.8 A |
| 2,892,782 | 6/1959 | Caffrey | 220—439 R X |
| 3,278,571 | 10/1966 | Mazdiyasni | 260—429 R X |

OTHER REFERENCES

Rochow: J. Chem. Education, 43, pp. 58–60.
Kuis et al.: Chem. Abst., 50, column 859.
Rochow: J. Am. Chem. Soc., 70 (1948), pp. 2170–1.
Zuckerman: J. Chem. Soc. (1963), pp. 1322–4.

JAMES E. POER, Primary Examiner
A. P. DEMERS, Assistant Examiner

U.S. Cl. X.R.

260—429.7, 440, 448.8 A, 448.8 H, 448.8 R